United States Patent [19]

Del Bello et al.

[11] Patent Number: 4,709,131
[45] Date of Patent: Nov. 24, 1987

[54] METHOD FOR ADAPTIVE CONTROL OF OPERATING PARAMETERS DURING SPARK-EROSIVE CUTTING AND SPARK-EROSIVE CUTTING PLANT FOR THE SAME

[75] Inventors: Athos Del Bello, Cugnasco; Beat Kilcher, Arcegno, both of Switzerland

[73] Assignee: AG fur industrielle Elektronik AGIE Losone b. Locarno, Losone, Switzerland

[21] Appl. No.: 733,003

[22] Filed: May 10, 1985

[30] Foreign Application Priority Data

May 11, 1984 [CH] Switzerland ............... 2355/84

[51] Int. Cl.⁴ ................ B23H 7/02; B23H 7/36
[52] U.S. Cl. ................ 219/69 M; 204/129.25; 204/224 M; 219/69 D; 219/69 P; 219/69 W
[58] Field of Search .......... 219/69 M, 69 W, 69 D, 219/69 C, 69 P; 204/206, 224 M, 129.25

[56] References Cited

U.S. PATENT DOCUMENTS

| | | | |
|---|---|---|---|
| 3,912,898 | 10/1975 | Pfau et al. | 219/69 D |
| 4,367,400 | 1/1983 | Otto et al. | 219/69 D |
| 4,415,791 | 11/1983 | Yamada | 219/69 G |
| 4,479,045 | 10/1984 | Inoue | 219/69 D |
| 4,504,722 | 3/1985 | Kishi et al. | 219/69 D |

FOREIGN PATENT DOCUMENTS

| | | | |
|---|---|---|---|
| 2007484 | 6/1983 | German Democratic Rep. | 219/69 D |
| 145194 | 12/1978 | Japan | 219/69 C |
| 163842 | 12/1981 | Japan | 219/69 M |
| 109230 | 6/1983 | Japan | 219/69 C |
| 206322 | 12/1983 | Japan | 219/69 D |
| 548256 | 4/1974 | Switzerland. | |
| 594477 | 1/1978 | Switzerland. | |
| 2018662 | 10/1979 | United Kingdom | 219/69 D |
| 2041574A | 9/1980 | United Kingdom | 219/69 C |

OTHER PUBLICATIONS

"The Role of the Dielectric Fluid in Electrical Discharge Machining" by Hockenberry 10/1968.
Kunert and Schulze, Theoretische Analyse des Einflusses der Spulbedingungen auf den elektroerosiven SenkprozeB, Elektrie 36, 1982, issue No. 3, pp. 126–128.
Kunert and Schulze, Grundlagen der Spulmengenregelung bei der funkenerosiven Metallbearbeitung, Elektrie 36, 1982, issue No. 5, pp. 255–258.
Kunert and Schulze, Spulverhaltnisse und ihre Optimierung beim elektroerosiven Trennen mit Hilfe einer Drahtelektrode, Elektrie 36, 1982, issue No. 7, pp. 371–375.

Primary Examiner—Philip H. Leung
Assistant Examiner—Geoffrey S. Evans
Attorney, Agent, or Firm—Neuman, Williams, Anderson & Olson

[57] ABSTRACT

The instantaneous flow state of the scavenging medium in the cutting plant work gap is determined and operating parameters of the spark-erosive cutting process are regulated and/or controlled as a function thereof. These operating parameters include the generator machining parameters such as pulse magnitude, pulse duration and pulse interval; the relative feed rate of the tool electrode; and the supply of the scavenging medium. For this purpose, the cutting plant includes a device for pressure and/or suction scavenging of the work gap and a control device for adaptively controlling the operating parameters, including at least one sensor for determining the instantaneous flow state of the scavenging medium in the work gap and at least one control element.

9 Claims, 8 Drawing Figures

METHOD FOR ADAPTIVE CONTROL OF OPERATING PARAMETERS DURING SPARK-EROSIVE CUTTING AND SPARK-EROSIVE CUTTING PLANT FOR THE SAME

BACKGROUND OF THE INVENTION

The present invention relates to a method for the adaptive control of operating parameters during the spark-erosive cutting of a workpiece in a spark-erosive cutting plant having pressure and/or suction scavenging of the work gap. The invention also relates to a spark-erosive cutting plant with a device for the pressure and/or suction scavenging of the work gap and adaptive control device for the control of operating parameters in accordance with the sensed instantaneous flow state of the scavenging medium in the work gap.

Such a method and apparatus are known from Swiss Pat. No. 548,256. In the known method and apparatus, operating parameters such as the scavenging medium flow quantity and the duration of the interval between the operating pulses are controlled or regulated as a function of the actual parameter values, to be considered as process quantities. The known method and apparatus permit a usable regulation of the manipulated variables for the operating parameters. However in the case of extreme cutting conditions, such as occur more frequently during the general technical development, the known method and apparatus are no longer adequate for ensuring optimum cutting conditions in all circumstances, so that there is a risk of wire breaks.

A wire break frequently results from the fact that the quantity of scavenging medium flowing through the work gap, e.g. deionized water, undergoes variations. A change to the scavenging medium flow rate through the work gap can result not only from fluctuations in the scavenging medium supply, but also can be due to varying cutting situations, particularly varying geometrical conditions, including varying scavenging cross-sections. A deterioration of the scavenging conditions can result if closely spaced contour elements appear in the cutting path; the cutting path comes into the vicinity of a starting bore; the workpiece surface has steps or shoulders; or there is a transition from a cylindrical cut into a three-dimensional cut. Unfavorable scavenging conditions are also obtained when cutting is begun from the outside of the workpiece.

SUMMARY OF THE INVENTION

The problem addressed by the present invention is to further develop the aforementioned prior art method and spark-erosive cutting plant, while retaining their advantages, so that the risk of wire breaks is reduced.

From the method standpoint, this problem is solved in that the control signals for controlling the operating parameters are produced as a function of the instantaneous flow state of the scavenging medium in the work gap.

From the apparatus standpoint, this problem is solved in that the spark-erosive cutting plant has at least one sensor for determining the instantaneous flow state of the scavenging medium in the work gap.

Thus, according to this invention, the actual flow state conditions are measured and operating parameters, which may also optionally include the actual flow state, are altered in consideration thereof. The operating parameters can also be preprogrammed setting parameters, e.g. the setting parameters To1 ... Ton.

The aforementioned solutions have the advantage that they permit an automatic adaptation of the operating clearance and/or an optimization of the flow state, so that the risk of wire breaks is reduced and higher operational reliability is ensured when cutting.

Preference is given to the control of the operating parameters of the generator operation, the tool electrode, the relative movement between the tool electrode and the workpiece and/or the supply of scavenging medium to the work gap. For this purpose, in one embodiment at least one control element of the cutting plant is connected to at least one first setting device for setting the generator operation, at least one second setting device for setting the relative movement between the tool electrode and the workpiece and/or at least one third setting device for setting the scavenging medium supply.

As an operating parameter of the generator operation, preferably the generator capacity is set by means of the first setting device. If it is a pulse generator then, by means of the first setting device, the pulse magnitude, the pulse duration and/or the interval time may be modified as a function of the instantaneous flow state.

In place of or in addition to the modification of the generator operation as a function of the instantaneous flow state, the tool electrode advance can be controlled by means of the second setting device, as a function of the instantaneous flow state.

In the case of a wire or strip-like tool electrode, according to another embodiment, preferably the mechanical tension on the tool electrode is modified by means of the second setting device, once again as a function of the instantaneous flow state of the scavenging medium in the work gap. This change can also take place in addition to, or as an alternative to the aforementioned changes to the generator operation and the relative movement between the tool electrode and the workpiece.

According to another preferred embodiment, as an alternative to or in addition to changes to the aforementioned operating parameters, it is possible to control the scavenging medium quantity supplied to the work gap per unit of time and/or the pressure gradient of the scavenging medium in said gap by means of the third setting device, once again as a function of the instantaneous flow state.

According to another preferred embodiment, the instantaneous flow state of the scavenging medium in the work gap clearance can be determined by the instantaneous pressure gradient prevailing there or its instantaneous throughput. For this purpose, the plant has corresponding sensors. If, for example, the pressure gradient is to be determined, it is preferable to provide a liquid pressure sensor, which is connected on the inlet side to the first pressure chamber issuing into the scavenging inlet or outlet of the work gap. A single pressure sensor is then sufficient for the adequate determination of the pressure gradient, if it can be assumed that on the other side of the work gap there is a substantially constant pressure, e.g. atmospheric pressure, or that the pressure fluctuations on the gap side opposite to the pressure sensor are so small that they only slightly modify the flow state in the work gap.

However, the plant preferably has two liquid pressure sensors, which are in each case connected on the inlet side to a pressure chamber, one pressure chamber being positioned at the inlet and the other pressure chamber at the outlet of the work gap. As a result of these two pressure sensors, the pressure gradient effective in the work gap can be sufficiently accurately determined, for example, by the two pressure sensors being connected through a differentiator to a pressure difference sensing means.

The aforementioned determination of the flow state or the scavenging medium flow rate or throughput through the work gap utilizes the Bernouilli Law in that the latter shows that the flow rate of a gas or liquid through a pipe system is dependent on the difference in the pressures of the inlet and outlet of the system. It can first be concluded from that law that as the flow rate of the scavenging medium through the work gap decreases, the pressure difference at the two ends of the work gap must also be smaller. Thus, conclusions can be drawn on the scavenging conditions in the work gap through the measurement of the pressure difference.

BRIEF DESCRIPTION OF THE DRAWINGS

The invention is described in greater detail hereinafter relative to illustrative embodiments and the attached drawings, which show.

DETAILED DESCRIPTION OF THE PREFERRED EMBODIMENTS

Figure 1:
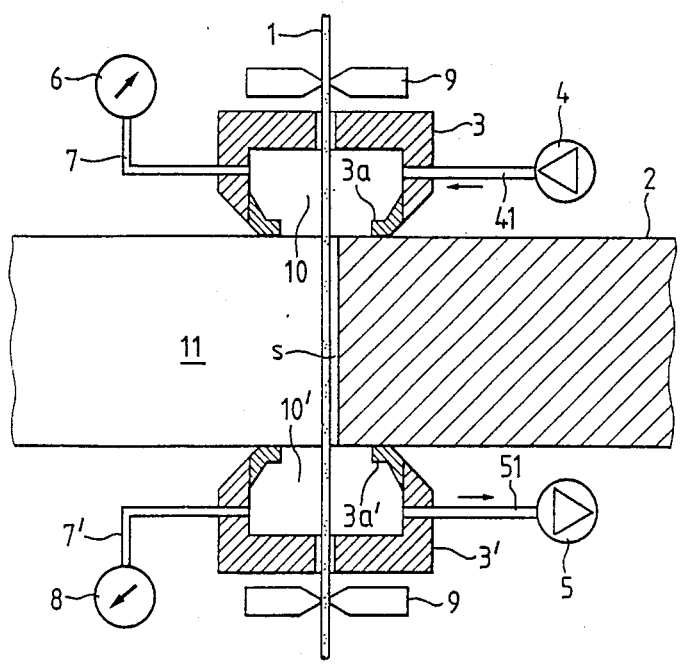
FIG. 1—a longitudinal section through a first embodiment of the present invention.

FIG. 1 illustrates the situation when cutting a plane-parallel workpiece 2 in a spark-erosive cutting plant. For purposes of easier representation, only a cutaway section of a spark-erosive cutting plant is shown in diagrammatic manner. The wire electrode 1 is passed through the workpiece by means of a known wire advance means, this being from left to right in FIG. 1. The previously cut gap is shown without hatching in the drawing and is given reference numeral 11. The as yet uncut portion of the workpiece 2 is shown in hatched form, and the work gap is designated by reference numeral S. The wire electrode 1 is held in the workpiece 2 by known wire guide elements 9 in a geometrically defined position and generally under tension. In FIG. 1, this is in a direction vertically through the workpiece 2. Guide elements of the type known, e.g. Swiss Pat. No. 594,477, can be used.

For the purpose of scavenging the work gap S, use is made of a scavenging system having a sealing system 3 closely spaced to the planar surface of workpiece 2, an admission pipe 41 connected to system 3 and a pressure pump 4 connected to pipe 41. Pressure pump 4 delivers scavenging medium, e.g. deionized water, by admission pipe 41 into an upper pressure chamber 10 surrounded on the one hand by the sealing system 3 and on the other hand by part of the planar workpiece surface. An increased sealing action is obtained by a slide ring 3a of sealing system 3 which rests directly on the workpiece surface. The slide ring 3a can be frontally provided with annular grooves, in which the working medium can be held as a slide-assisting lubrication medium. The slide ring is also made from a material which, apart from having good wear characteristics, has good sliding characteristics on metal surfaces.

In the represented embodiment, the sealing system 3 is essentially constructed in nozzle or chamberlike manner. In accordance with the path curve to be cut, the sealing system 3 is guided with the wire electrode 1 and for this purpose is not positively connected to guide elements 9.

The pressure chamber may be a sealed scavenging chamber between two spaced, superimposed workpieces as described in the German Pat. No. 2,833,765. A scavenging system is also arranged on the side of work gap S opposite to the upper sealing system 3. It has a lower sealing system 3', a discharge pipe 51 and a suction pump 5. The lower scavenging system is in principle constructed in the same way as the upper scavenging system. Thus, it has a lower pressure chamber 10' and a lower slide ring 3a'. The lower sealing system also moves synchronously with that part of the wire electrode 1 passing out of the work gap S. Thus, it is not positively connected to the lower wire guide elements 9.

Pressure pump 4 delivers the scavenging medium under pressure into work gap S. On the opposite side, the contaminated medium is sucked off through the suction pump 5, carrying along removed material particles and gas bubbles. Preferably, the overall scavenging system comprising the upper and lower scavenging means is designed and set in such a way that the wire electrode 1 is coaxially scavenged by a scavenging jet.

In the embodiment shown in FIG. 1, the upper pressure chamber 10 is connected by a measuring pipe 7 to the pressure gauge 6 and the lower pressure chamber 10' is connected by a measuring pipe 7' to a vacuum gauge 8. The pressure gauge 6 consequently indicates the pressure in the upper pressure chamber 10, while the vacuum gauge 8 indicates the pressure in the lower pressure chamber 10'. By evaluating the two measured pressure values the pressure gradient is obtained, that is the difference between the pressure value in the upper pressure chamber 10 and the pressure value in the lower pressure chamber 10'. This difference can be automatically determined by a differential circuit.

If it is wished to control or regulate the pressure gradient to a constant value, then the instantaneous pressure gradient value is compared with a predetermined desired value or, in the case of variable desired values, a so-called guide value. A control signal is derived from the comparison result and is supplied to a regulating element for modifying the pumping of pressure pump 4 and/or suction pump 5.

As was stated hereinbefore, it is possible to derive from the difference between the desired and actual values a signal for controlling the generator operation and/or the wire tension and/or the wire feed, including a wire return.

It can generally be assumed in the embodiment according to FIG. 1 that fluctuations in the pressure gradient only occur within a small range, because in this case a workpiece with plane-parallel surfaces would be assumed. Minor fluctuations could be due to fluctuations in the supply of the scavenging medium by the pressure pump 4 and/or suction pump 5, or short term, poor sealing between slide ring 3a or 3a' and the workpiece surface.

FIG. 2 shows certain cases where the scavenging conditions during cutting are not of such an optimum nature, particularly where there is a poor seal between the sealing system 3 or 3' and the workpiece surface. In both FIG. 2 and the following Figures, the reference numerals used in FIG. 1 are again employed with corresponding elements.

Figure 2A:
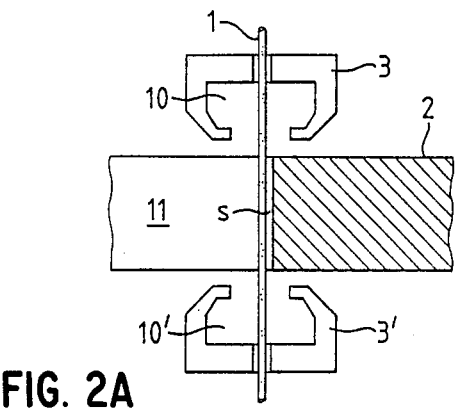
FIGS. 2a to 2d—different working conditions occurring during spark-erosive cutting.

FIG. 2a shows a cutting situation in which it is necessary for there to be a spacing between the upper and lower sealing system 3 or 3' and the workpiece surface, for example, to avoid collision or to allow for clamping of the workpiece.

Figure 2B:
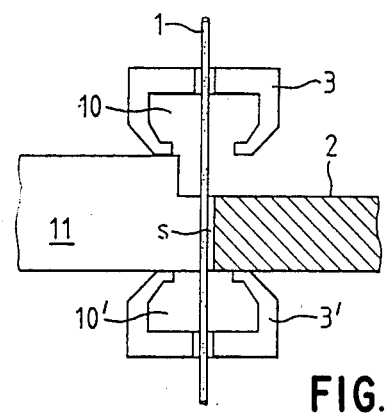

FIG. 2b shows a poor seal between the upper scavenging system and the upper workpiece surface, because the workpiece 2 has a step on its upper surface. This also applies in the case where the workpiece 2 is offset on its lower surface.

Figure 2C:
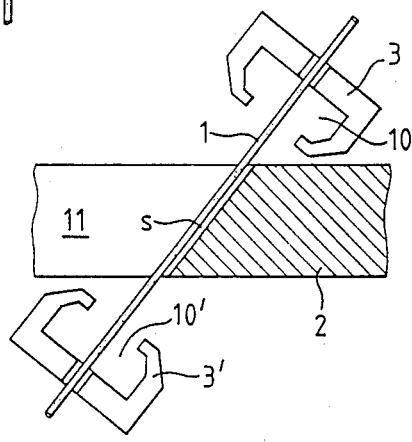

FIG. 2c shows a poor seal resulting from a conical cut having to be made.

Figure 2D:
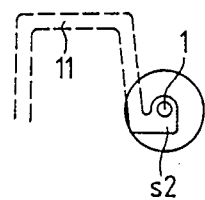

FIG. 2d shows a cutting situation in which the wire electrode 1 must be guided around closely following corners. This leads to a comparatively large scavenging surface S2, which consequently requires a larger scavenging medium flow rate.

Figure 3:
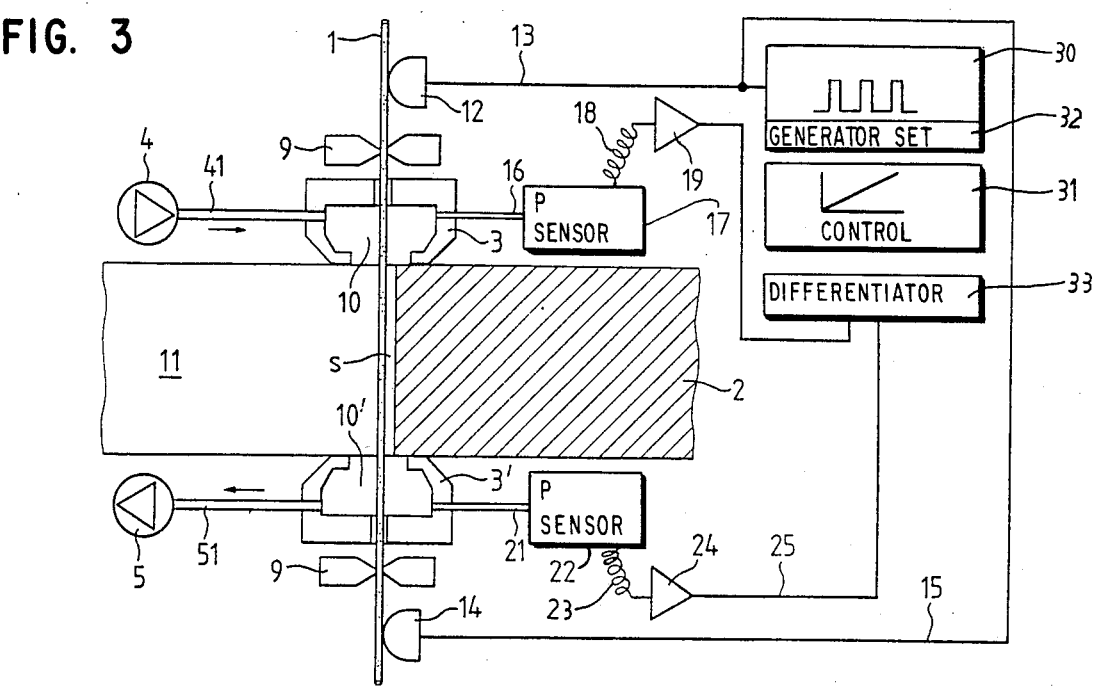
FIG. 3—a section and partial block diagram of a second embodiment of the present invention.

FIG. 3 differs from FIG. 1 in that there is also shown a pulse generator 30, current feeds 12, 14 to the wire electrode 1 and electrical connecting lines 13, 15 between generator 30 and current feeds 12, 14. The represented generator 30 is in this and the following embodiments a pulse generator. The pressure and vacuum gauges 6, 8 shown in FIG. 1, as well as the measuring pipes 7, 7' are replaced in this embodiment by pressure sensors 17, 22 and measuring lines 16, 21, which can be in the form of thin pipes or pressure hoses. In each case, the pressure sensors 17, 22 are equipped with electrofluidic transducers, whose output signals are supplied by spiral cables 18, 23 to signal amplifiers 19, 24. Spiral cables 18, 23 are used for bridging different clearances between pressure sensors 17, 22 and the amplifiers 19, 24 associated therewith.

The output signals of signal amplifiers 19, 24 are supplied by electrical lines 20, 25 to a common differentiator 33. The output signal of the differentiator 33 is the difference of the pressure signals supplied from signal amplifiers 19, 24. The output signal of differentiator 33 is applied to a control element 31. The latter initially compares in a comparator stage the measured pressure difference, i.e. the actual pressure difference value, with a predetermined desired value for the pressure difference. The result of this comparison forms an error signal, from which is then derived in control element 31 a control signal for driving the generator setting device 32, which is adapted to modify the generator pulse frequency, i.e. the pulse and/or interval duration. Control element 31 in conjunction with the generator setting device 32 is designed in such a way that in the case of an instantaneous pressure gradient along the work gap S below the desired value, the generator capacity is reduced through the pulse frequency. That is, less electrical energy per unit of time is supplied to the wire electrode 1. The pulse magnitude can be reduced in lieu of modifying the pulse frequency.

In the embodiment of FIG. 3, it is fundamentally possible to interchange the pressure and suction side. The lower pressure chamber 10' in FIG. 3 can be supplied with scavenging medium under pressure, and the scavenging medium removed by suction from the upper pressure chamber 10.

Alternately, the scavenging medium can be supplied to both sides to the work gap S under pressure through both the upper and the lower scavenging system. In this case, the signals from signal amplifiers 19, 24 are not supplied to a common differentiator. Instead, each amplifier 19, 24 is connected to its own control element, not shown. In a known manner, the control element performs a comparison between the actual and desired values and derives a control signal from the difference between these values. In order to ensure that the generator capacity is reduced, if only one of the two pressure sensors 17 or 22 indicates a pressure signal below the desired value, the outputs of both control elements are connected through a common OR gate to the generator setting device 32.

Fundamentally, a better control of the scavenging conditions can be achieved if only one pressure chamber 10 or 10' is connected to a pressure sensor 17 or 22. The scavenging medium can either be introduced into pressure chamber 10 under pressure or can be removed by suction therefrom. This measure has the advantage of reduced measurement construction costs. However, it is only generally worthwhile in those cases where the work gap S is relatively short or very narrow.

In the present embodiment, the flow state of the scavenging medium in the gap is determined by measuring the scavenging pressure or pressure gradient, and from the measured result a control signal is derived for influencing the generator capacity. However, it is fundamentally also possible to derive from the measured result a control signal for influencing the wire tension, the wire advance, the capacity of the pressure or suction pumps and/or the scavenging medium supply. It is also possible to influence or control several of the aforementioned operating parameters jointly, as a function of the instantaneous flow state.

Figure 4:
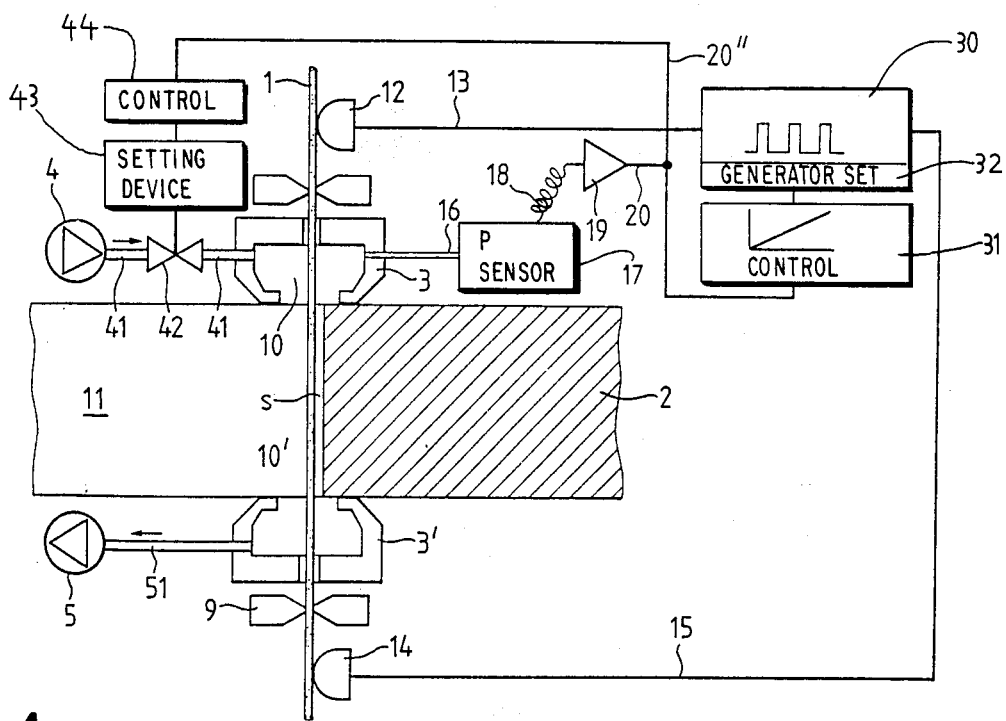
FIG. 4—a section and partial block diagram of a third embodiment of the present invention.

An embodiment for the common control or influencing of the scavenging medium supply and the generator capacity is diagrammatically illustrated by FIG. 4.

The embodiments diagrammatically represented in FIGS. 3 and 4 essentially differ from one another in that, in FIG. 4, the pressure is only measured in the upper chamber 10 and the test signal is additionally supplied to a further control element 44 for controlling a setting device for a regulating valve 42 in admission pipe 41. In known manner, the latter is able to modify the effective flow cross-section of the scavenging medium in admission pipe 41. The regulating valve 42 is set by means of a servomotor 43, which in this case serves as a setting device. Servomotor 43 is driven by control member 44, which in known manner compares the actual pressure value supplied to it by amplifier 19 with a given desired pressure value and processes the error signal obtained therefrom to give a control signal for the servomotor 43. As only a pressure value and not the pressure gradient is measured in the represented example, there is no need for the differentiator 33 shown in FIG. 3.

Fundamentally, the risk of wire breaks can be reduced through using the output signal of pressure sensor 17 solely for controlling regulating valve 42. However, the simultaneous control of the generator capacity and the flow cross-section in admission pipe 41 does have the advantage of requiring less intervention on generator 30 and/or regulating valve 42 for preventing wire breaks. Thus, both measures mutually assist one another for achieving the sought objective. Thus, if the actual value in pressure chamber 10 is below the desired value in pressure chamber 10 is below the desired value, not only is the flow cross-section on regulating valve 42 increased, but also the power supplied by generator 30 to current feeds 12, 14 is reduced. The increase in the flow cross-section of regulating valve 42 is used for restoring an optimum flow state and consequently for reducing the risk of wire breaks by improving the electrical and hydrodynamic conditions in work gap S. The reduction of the electric power supplied by generator 30 to the wire electrode also leads to reduced loading thereof.

From the regulating standpoint, the embodiment shown in FIG. 4 constitutes a combination of a regulating system and a control system, for solving the same problem. Thus, through the control of regulating valve 42, direct action takes place on the pressure in pressure chamber 10. The effect of this result is measured by pressure sensor 17 and the regulating valve 42 is controlled by means of output signal of pressure sensor 17. Thus, it is a closed circuit in the sense of a regulation. However, the control circuit comprising the pressure sensor 17, control element 31, generator setting device 32, generator 30 and current feed 12 is an open circuit, a control chain.

In addition to or in place of the aforementioned measures, the signal measured by pressure sensor 17 can be supplied to a further control element, not shown, for the direct control of the pumping capacity, i.e. the scavenging medium quantity delivered by the supply pressure pump 4.

In the embodiment shown in FIG. 4, as in the embodiment shown in FIG. 3, the lower pressure chamber 10' can also be equipped with a pressure sensor and a seriesconnected signal amplifier. If it is constructed as a pressure/suction scavenging system, then the signal amplifier outputs are again supplied to a differentiator (as in FIG. 3) and the result passed onto appropriate control elements, for example, to the control element 31 connected to generator 30 and control element 44 connected to regulating valve 42. As a further alternative, the suction pump 5 shown in FIG. 4 can be replaced by a pressure pump. In a known manner, the generator setting device 32 intervenes in the generator operation for the modification thereof and in particular for the modification of the generator capacity by modifying the pulse width or shape, etc.

Figure 5:
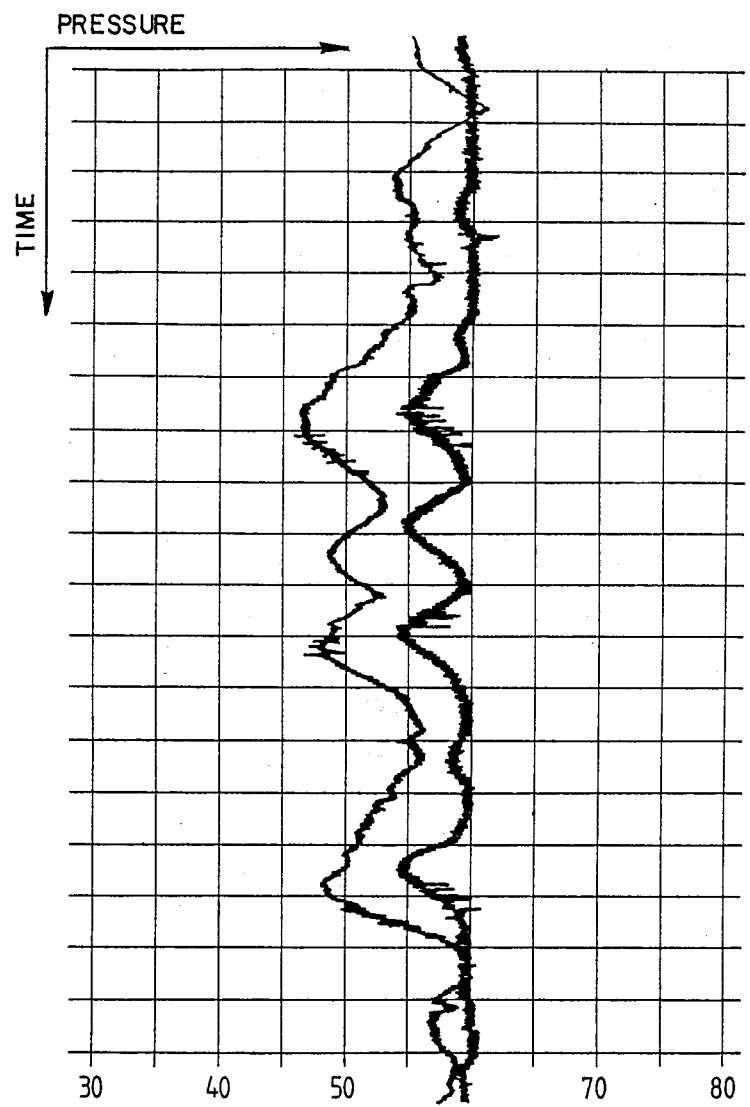
FIG. 5—a graphical representation of the pressure difference measured during scavenging of the work gap.

FIG. 5 illustrates a recording of pressure curves by means of a XY-recorder. This is essentially based on the embodiment of FIG. 1.

The invention solves not only the longstanding problem of reducing wire break risks, but also the longstanding problem of obtaining optimum scavenging conditions and therefore electrical conditions in the work gap, while using the most efficient technical means.

What is claimed is:

1. In a spark-erosive cutting plant using a supplied scavenging medium to scavenge the work gap, a method for the adaptive control of operating parameters of the spark-erosive machining comprising the steps of measuring the pressure gradient of the scavenging medium in the work gap between an inlet to the work gap and an outlet of the work gap; generating a signal indicative of the pressure gradient of the scavenging medium in the work gap; comparing said signal with a signal indicative of a desired pressure gradient of the scavenging medium in the work gap and forming an error signal therefrom; and altering at least one of said operating parameters in accordance with the error signal.

2. A method according to claim 1 in which the operating parameters include generator machining parameters such as pulse magnitude, pulse duration and pulse interval duration; advance of the tool electrode; the tool electrode voltage; flow rate and pressure gradient of the scavenging medium supplied to the work gap; and the mechanical tension on the tool electrode where a wire or strip tool electrode is used.

3. A method according to claim 1 in which the step of altering at least one of said operating parameters is done so as to reduce the error signal.

4. A method according to claim 1 in which the pressure gradient is measured by comparing the pressure at a scavenging medium inlet of the work gap with the pressure at a scavenging medium outlet of the work gap.

5. In a spark-erosive cutting plant having a filamentary tool electrode and using a supplied scavenging medium to scavenge the work gap and including an inlet to the work gap for the supply of scavenging medium and an outlet of the work gap for removal of the scavenging medium, a method for adaptive control of operating parameters of the spark-erosive machining comprising the steps of sensing the pressure at the scavenging medium inlet and forming a signal indicative thereof; sensing the pressure at the scavenging medium outlet and forming a signal indicative thereof; forming a signal indicative of the pressure gradient of the scavenging medium in the work gap between said inlet and outlet by forming the difference between the two pressure signals; comparing the difference signal with a signal indicative of a preselected desired value for the pressure difference and forming an error signal indicative of the difference thereof; and in consideration of the error signal, altering at least one of said operating parameters of the spark-erosive machining.

6. A method according to claim 5 in which the step of altering at least one of said operating parameters is done so as to reduce the error signal.

7. A method according to claim 5 in which the operating parameters include generator machining parameters such as pulse magnitude, pulse duration and pulse interval duration; advance of the tool electrode; the tool electrode voltage; flow rate and pressure gradient of the scavenging medium supplied to the work gap; and the mechanical tension on the tool electrode where a wire tool or strip tool electrode is used.

8. A spark-erosive cutting plant for the spark-erosive cutting of a workpiece by a filamentary tool electrode, comprising means for supplying scavenging medium to a work gap formed between the tool electrode and the workpiece, said scavenging medium supply means comprising a chamber having a scavenging medium outlet located in close proximity to one side of the work gap; means for removing scavenging medium from the work gap; means connected to the scavenging medium supply means for sensing the pressure therein; means connected to the scavenging medium removal means for sensing the pressure therein; means connected to both sensing means for forming a signal indicative of the difference in sensed pressures; means for comparing the difference signal with a signal indicative of a desired pressure difference and forming an error signal on the basis of this comparison; and control means connected to the comparison means for altering at least one operating parameter of the spark-erosive machining in consideration of the error signal.

9. A spark-erosive cutting plant according to claim 8 wherein the means for removing scavenging medium from the work gap comprises a chamber having an opening located in close proximity to another side of the work gap.

* * * * *